Aug. 18, 1942.  R. BROWN  2,293,422
PORCELAIN COFFEE GRINDING ELEMENT
Filed Oct. 18, 1938
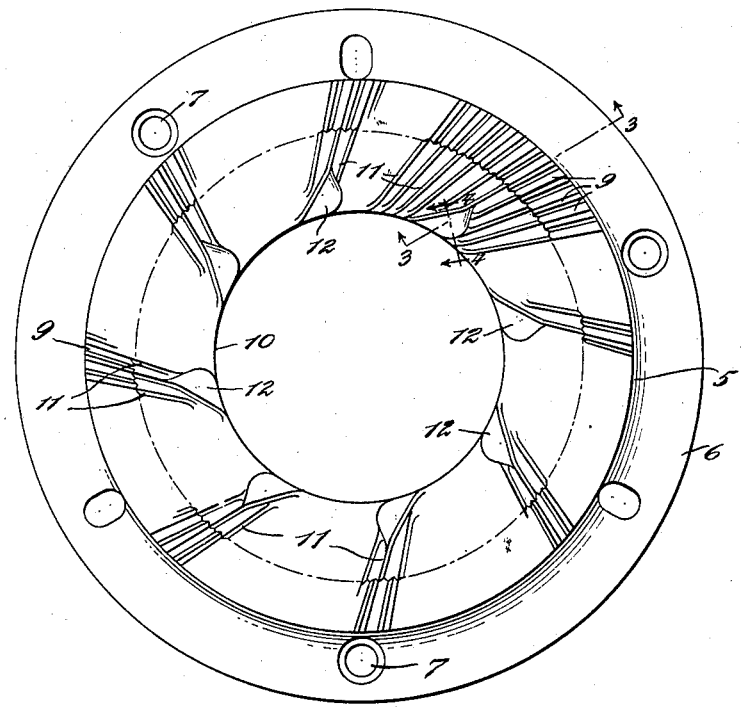
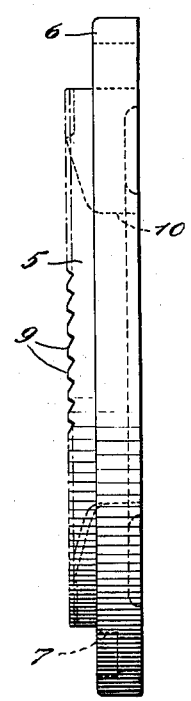
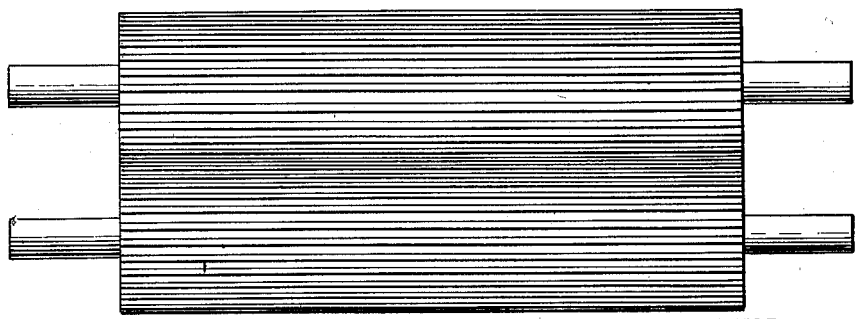
INVENTOR
ROBERT BROWN
BY
ATTORNEYS Patented Aug. 18, 1942

2,293,422

UNITED STATES PATENT OFFICE 2,293,422

PORCELAIN COFFEE GRINDING ELEMENT

Robert Brown, New York, N. Y.

Application October 18, 1938, Serial No. 235,634

2 Claims. (Cl. 83—18)

The invention relates to grinding devices and more particularly to devices for use in the grinding of materials such as coffee, spices, or the like, as well as for colloidal grinding of other substances.

The principal object of my invention is to provide a grinding member formed of a vitreous material which may be first formed and subsequently fired, the final product constituting an effective grinding member. Such a material is, of course, capable of being shaped into different forms for different grinding processes prior to firing and is after firing extremely hard and tough.

Still another object of my invention is to provide a ceramic grinder adapted to be readily substituted for the metallic grinders heretofore used, without the necessity of rebuilding the old machine.

Still another object of the invention is to provide a grinding ring or rings composed of material having a low co-efficient of conductivity and also having a surface and body inert to the acids and oils usually released in the grinding of spices and the like.

For the purpose of illustration I have shown in the accompanying drawing a form of grinding device or ring such as is commonly employed in the grinding of coffee beans. It is to be understood, however, that the invention is not limited to the particular conformation of the grinder and that other forms may be employed without departing from the spirit or scope of the invention.

In the drawing:

Figure 1 is a top plan view of a grinding ring embodying my invention.

Figure 2 is a cross section on the line 2—2 thereof.

Figures 3 and 4 are fragmentary cross-sectional views illustrating respectively sections on lines 3—3 and 4—4 of Figure 1.

Fig. 5 shows grinding members in the form of a pair of rolls.

In the grinding of aromatic spices, one of the great difficulties arises from the fact that in the grinding process the frictional heat generated causes an exceedingly rapid, as well as continuous, rise in the temperature of the grinding plates or rings. The aroma, and hence the value, of spices as seasoning and the taste of coffee produced from the ground coffee bean, depend almost exclusively upon the essential oils which are the carriers of the aroma and taste of the ground product either used as a spice or resulting from the production of coffee from the ground beans. The volatilizing temperature of these essential oils is comparatively low. In coffee, for instance, substantially all of the essential oils are volatilized should the coffee bean be heated to a temperature of 150°. In some spices the temperatures are even lower. It, therefore, follows that in the production of ground spices and coffee, if the temperature of the grinding rings is sufficiently high to raise the temperature of the coffee beans or spice beans above the volatilization point of some or all of the essential oils, the finished product will carry but a trace of the taste and bouquet which the original product contained. In addition to the foregoing I have found that coffee ground with metal rings is also darker than the same coffee when ground with porcelain plates.

It has been found, particularly in the grinding of coffee, that the power involved in operating the grinding disks or rings must be progressively increased with the rise in temperature of the grinding plates. This phenomenon is attributed to the fact that the fibers of the coffee bean are brittle at low temperature but become rubbery at comparatively high temperatures, that is temperatures above 130° F. It is, therefore, apparent that as soon as the frictional heat generated by the grinding process has reached a point where the fibers of the coffee bean cease to be brittle the power required (to produce a lesser amount of the ground product) becomes progressively greater and since the temperature of the grinding ring is controlled by the frictional heat generated it will be obvious that the finer the grind, the more rapid will be the rise in temperature and the greater will be the amount of additional power consequently required.

Various expedients have been attempted, particularly in the grinding of coffee, to overcome the progressively increasing consumption of power and it has been recognized that this power consumption could be decreased if it were possible to prevent the rapid rise in the temperature of the grinding rings and the machine. Among the expedients, attempts have been made to utilize hollow metal rings and to cool the same by flowing a coolant through the interior of the rings. These attempts have not been successful since it has been found that the coolant flowing through the rings will cause them to sweat, that is to say, moisture will condense on the face of the rings and this moisture will immediately be absorbed by the ground product and form a hard compound filling the teeth of the grinder and rendering the grinder useless. It has, therefore, been customary in large coffee producing plants to provide a number of machines and to operate only certain of these machines at any given time. A machine is operated until the same becomes so heated that the power consumption is greatly increased. This machine is then stopped and the grinding carried on with another machine until it likewise becomes in turn heated to a high degree. The grinding is then carried on by the first machine which has by this time cooled sufficiently to permit its operation. This procedure necessitates the installation of a greater number of machines than would be required were the process carried on continuously and is thus not only expensive in connection with the purchase of machines but also necessitates a vastly greater floor space than would ordinarily be required. It might be noted that where the grinding of coffee is continuous in a single machine, despite excessive consumption of power, the resulting product has become heated to such a degree that substantially all of the volatile oils have been volatilized, causing the resultant product to lose all of its volatile flavor.

I have discovered that by substituting for the metallic rings, rings of material such, for example, as high grade porcelain, it is possible to operate a grinding mill over a long period of time without excessive heating of the machine and that the product and output of the machine are uniform and substantially constant.

Since ceramic rings have less conductivity than metal rings, it would seem that this discovery is contrary to the normal and expected results. Theoretically at least the grinding surface of a metallic grinding ring should be maintained at a lower temperature than the corresponding surface of a ceramic ring since in the case of the metallic ring the surface heat generated by the grinding process should be partially dissipated by the rapid transfer of at least a portion of this heat to the body of the ring and from the latter to the co-acting parts of the machine. Such is not the case, however, since I have found by experiment that metallic rings used in the grinding of coffee have an extremely rapid rise in temperature, which continues throughout the entire grinding process. The grinding surfaces of ceramic rings, on the other hand, have a very slow rise in temperature and the temperature curve, after rising from normal room temperature to approximately 125° F., flattens out and the rise from this point is at a very much lower rate than up to 125° F. In fact, the temperature rise is so gradual above 125° F. that as a result of the experiments which I have conducted I have determined that a temperature of from 124° F. to 130° F. is substantially the maximum temperature which the grinding surface of the ceramic ring will attain although used continuously over a long period of time.

In the course of my experiments I have found that, by using two machines of identical types, one provided with the usual metallic grinding rings and the other using porcelain grinding rings utilizing the same type of coffee beans, the machine provided with the metallic rings will always show an increase of approximately fifty percent (50%) in temperature over the machine provided with porcelain grinding rings operating under the same power and for like periods of time.

A further beneficial result is obtained by reason of the use of the ceramic rings. Owing to their low heat transfer co-efficient they prevent the body of the machine from being heated by the surface friction of the grinders. The body of the machine, therefore, is maintained at a very much lower temperature with ceramic grinding rings than is the case where metallic grinding rings are used. This is extremely beneficial in that the coffee bean or other spice is comparatively cool at the time of its introduction between the grinding surfaces. The fibers, therefore, are brittle and the amount of power necessary to pulverize the bean is very much less than it would be otherwise.

It is believed that this phenomenon accompanying the use of a porcelain grinding ring is in part due to its poor conductivity, the mass of the porcelain grinding ring being greater than the mass of a metal ring. The frictional heat generated on the surface of the porcelain ring is confined to the surface area and is not conducted through the body of the ring and to the other parts of the machine. Since the porcelain rings are unglazed the surfaces of the rings tend to grip the coffee bean or other product and effect the crushing thereof without the beans sliding frictionally along the surface of the ring. This action of the porcelain material reduces the frictional heat generated by the grinding process. It is also believed, since the frictional heat is largely confined to the surface of the rings, that the cool coffee or other ground product which continually passes over the surface of the rings acts as a coolant and to a large extent dissipates the heat which would otherwise be concentrated in the surface of the grinding ring. It is also considered possible that since the grinding surface of the ring, when made from ceramic material, is impervious and unaffected by the acids which are carried by the coffee bean, there will be no chemical reaction between these acids and the grinding surface, whereas in utilizing metallic rings there is a noticeable reaction which at times is of sufficient extent to materially affect the flavor and character of the product.

It is therefore apparent from the foregoing that by maintaining the temperature of the grinding surfaces of the rings at a point materially below the volatilizing temperature of the essential oils in the spice or coffee bean, the ground product continually produced by the machine will retain all of these oils and neither the aroma nor the taste of the resultant product will be adversely affected.

In the accompanying drawing I have illustrated only a single ring of the two employed in the grinding of coffee. Since the co-acting grinding rings are identical, a description of one will suffice. I preferably form the ring 5 with an outer or circumferential flange 6 by means of which the rings are secured to their respective face plates by bolts or other fastening means (not shown) which pass through the openings 7 provided in the flange 6.

Extending from the plane of the flange 6 is the grinding portion of the ring 5. This grinding portion comprises a narrow band of material having formed thereon a plurality of teeth 9, the teeth being preferably arranged at an angle to a radius of the ring. Each tooth has a sloping approach and a substantially vertical face, all of the teeth on each ring facing in the same direction.

Interposed between the inner edge of the grinder and the central opening 10 of each ring, I provide a series of ridges 11, each of which is arranged substantially parallel to the adjacent grinding teeth. Spaced at regular intervals around the inner periphery are a plurality of guiding or feeding members 12 by means of which the beans are fed into the space between the ridges and to the teeth of the grinders.

Having thus described my invention, I claim:

1. A grinding member for coffee grinders provided with teeth upon its active surface, said surface, including the said teeth, being made of unglazed porcelain.

2. In a coffee grinder, a pair of opposed grinding plates provided with teeth upon their active, opposed surfaces, said plates and said teeth being made of unglazed porcelain.

ROBERT BROWN.